United States Patent
Moriya et al.

[11] Patent Number: 5,876,469
[45] Date of Patent: Mar. 2, 1999

[54] METHOD OF HEAT TRANSFER IN REFORMER

[75] Inventors: Nobuo Moriya; Takao Kawai; Hiroshi Yagi; Ryosuke Shimizu; Yasumasa Morita, all of Yokohama, Japan

[73] Assignee: Chiyoda Corporation, Tokyo, Japan

[21] Appl. No.: 748,723

[22] Filed: Nov. 14, 1996

Related U.S. Application Data

[63] Continuation of Ser. No. 362,959, Dec. 23, 1994, abandoned.

[30] Foreign Application Priority Data

Dec. 28, 1993 [JP] Japan ..................... 5-334675
Nov. 9, 1994 [JP] Japan ..................... 6-274790

[51] Int. Cl.$^6$ .................. C10J 1/28; B01J 8/04
[52] U.S. Cl. ............ 48/197 R; 422/197; 422/211; 422/216; 422/221
[58] Field of Search .................. 422/189, 190, 422/196, 197, 211, 216, 221; 48/61, 75, 197 R; 165/142, 143; 264/63; 501/80

[56] References Cited

U.S. PATENT DOCUMENTS

| | | | |
|---|---|---|---|
| 3,712,595 | 1/1973 | Hirsch | 261/114.1 |
| 3,899,815 | 8/1975 | Maddox | 29/163.6 |

(List continued on next page.)

FOREIGN PATENT DOCUMENTS

| | | |
|---|---|---|
| 0197880 | 10/1986 | European Pat. Off. . |
| 2374947 | 7/1978 | France . |
| 2328610 | 1/1974 | Germany . |
| 3608635 | 9/1987 | Germany . |
| 3810521 | 10/1988 | Germany . |
| 61-110875 | 5/1986 | Japan . |
| 3-45311 | 7/1991 | Japan . |

OTHER PUBLICATIONS

Patent Abstracts of Japan. vol. 009, No. 247 (C–307), Oct. 3, 1985, and JP–A–60 103001 (Mitsubishi Jukogyo KK) Jun. 7, 1985, *abstract*.
Patent Abstracts of Japan. vol. 013, No. 592 (C–671), Dec. 26, 1989, and JP–A–01 249890 (Babcock Hitachi KK) Oct. 5, 1989, *abstract*.
Patent Abstracts of Japan. vol. 13 No. 238 (C–621), Jul. 24, 1989, JP–A–01 107843 (Toshiba Corp; Others: 01) Apr. 25, 1989, *abstract*.
Patent Abstracts of Japan vol. 13 No. 515 (C–655), Nov. 17, 1989, and JP–A–01 208303 (Tokyo Gas Co. Ltd.; Others: 01) Aug. 22, 1989, *abstract*.
Chemical Abstracts, vol. 117, No. 12, Sep. 21, 1992, Columbus, Ohio, U.S.; Abstract No. 115176p, Tsuchimoto et al. 'Waste heat–recovering methanol reformers and methanol reforming by using waste heat' *abstract* & JP–A–04 108 601 (Takuma Sogo Kenkyusho K.K.) Apr. 9, 1992, *abstract*.

Primary Examiner—Nina Bhat
Attorney, Agent, or Firm—Armstrong, Westerman, Hattori, McLeland & Naughton

[57] ABSTRACT

A reformed gas composed mainly of hydrogen and carbon monoxide to be used for a fuel cell is produced by using a multi-tubular reformer provided with bayonet type double-wall catalyst tubes and feeding hydrocarbon gas such as natural gas and steam to the reformer. Porous media of a ceramic material are arranged in such a manner in a shell side flue gas inlet part of the interior of the reformer as to envelop the leading end parts of the catalyst tubes. The transfer of heat from the flue gas to the catalyst tubes is enhanced because the porous media accumulate the heat from the flue gas and radiate the accumulated heat in the direction of the walls of the outer tubes of the catalyst tubes. The otherwise possible uneven transfer of heat to the catalyst tubes is prevented because the wall effect and the channelling of the flue gas are repressed. This invention, therefore, permits effective utilization of the thermal energy of the flue gas for the reforming reaction and enables the reformer to be stably operated.

12 Claims, 4 Drawing Sheets

U.S. PATENT DOCUMENTS

| | | | |
|---|---|---|---|
| 4,298,431 | 11/1981 | Depierre et al. | 376/290 |
| 4,378,336 | 3/1983 | Yoon | 422/201 |
| 4,451,441 | 5/1984 | Ernest et al. | 423/213.2 |
| 4,714,593 | 12/1987 | Naito et al. | 422/197 |
| 4,803,025 | 2/1989 | Brockmeyer | 264/63 |
| 4,808,558 | 2/1989 | Park et al. | 501/80 |
| 4,863,721 | 9/1989 | Twigg et al. | 423/651 |
| 5,322,116 | 6/1994 | Galloway et al. | 165/133 |

METHOD OF HEAT TRANSFER IN REFORMER

This application is a continuation of application Ser. No. 08/362,959 filed Dec. 23, 1994, now abandoned.

BACKGROUND OF THE INVENTION

1. Field of the Invention

This invention relates to the enhancement of heat transfer in a multi-tubular reformer intended for the production of a reformed gas to be used in a fuel cell. More particularly, this invention, in the production of a reformed gas to be used in a fuel cell by using a multi-tubular reformer provided with a plurality of bayonet type double-wall catalyst tubes in a pressure vessel, relates to a method of exalting the utilization efficiency of the heat of the flue gas and ensuring uniform heating of the catalyst tubes by preventing the shell wall effect in thermal radiation and also preventing channelling of the flue gas in the shell side and a reformer employing the method mentioned above.

2. Related Background Art

The electric power generation with a fuel cell has been attracting attention as a method of electric power generation which enjoys high efficiency and low polution to the environment. The fuel cell operates on the principle that a direct current is extracted through an external circuit connected to an anode (hydrogen electrode) and a cathode (oxygen electrode) by feeding continuously hydrogen and oxygen respectively to the anode and the cathode with an electrolyte disposed between the two electrodes.

The fuel cell is known in various types such as the alkali type (AFC), the phosphoric acid type (PAFC), and the molten carbonate type (MCFC), which depend on the kind of electrolyte to be used. These types are alike in feeding hydrogen (pure hydrogen or crude hydrogen) to the anode but are unlike in tolerating or not tolerating carbon dioxide or carbon monoxide in the hydrogen gas. The alkali type does not tolerate carbon dioxide or carbon monoxide in the hydrogen gas because carbon dioxide impairs the function of potassium hydroxide as an electrolyte and carbon monoxide poisons platinum being used as a catalyst and they both go to degrade the performance of the fuel cell. Thus, this type is at a disadvantage in necessitating use of substantially pure hydrogen as a fuel gas. The phosphoric acid type tolerates carbon dioxide but does not tolerate carbon monoxide because the latter poisons platinum being used as a catalyst. Thus, this type permits use of crude hydrogen on the condition that the carbon monoxide in the crude hydrogen be caused to react with steam in a carbon monoxide converter and converted into carbon dioxide and hydrogen. The molten carbonate type does not use a platinum catalyst and, therefore, tolerates both carbon dioxide and carbon monoxide in the hydrogen gas and, moreover, enjoys the advantage that the carbon monoxide reacts with the water generated at the anode to generate hydrogen which can be utilized as the fuel. Since the molten carbonate type has many other economic merits, it offers a promising prospect as an alternative to the thermal electric power generation of the medium to small scale. Besides the types mentioned above, the fuel cell is known in the solid electrolyte type (SOFC), the polymer type (PFC) and so forth. Though these types have characteristics of their own, they are alike those mentioned above in feeding hydrogen to the anode.

The crude hydrogen which is fed to the anode in the phosphoric acid type or the molten carbonate type fuel cell is generally produced by using hydrocarbon, such as natural gas (having methane as a main component) as a raw material and causing it to react with steam. This reaction is thought to proceed as represented by the following formula (1) or (2).

$$CH_4 + H_2O \rightarrow CO + 3H_2 \qquad (1)$$

$$CH_4 + 2H_2O \rightarrow CO_2 + 4H_2 \qquad (2)$$

The reaction is endothermic in nature and is generally carried out in the presence of a catalyst at a temperature in the range of from 600° C. to 1000° C. The reformer is an apparatus to be used for implementing this reaction. It is generally so constructed as to pass the feed gas (natural gas and steam) through reaction tubes loaded with a catalyst and heat externally the reaction tubes by means of a burner or a hot fluid produced by catalytic combustion.

The reformer provided with bayonet type double-wall catalyst tubes, among other types, has been in popular use to date. A typical structure of the reformer of this type is illustrated schematically in FIG. 1. In FIG. 1, natural gas and steam as raw materials are introduced into a pressure vessel 1 via a feed gas inlet 2 disposed at one end (the top part in the diagram) of the pressure vessel and caused to flow through the clearances between inner tubes 3 and outer tubes 4 which jointly constitute bayonet type double-wall catalyst tubes. These clearances are loaded with a reforming catalyst 5. While the feed gas is flowing through the catalyst layer, the natural gas and the steam react with each other to produce a hydrogen-containing reformed gas. Then, the produced reformed gas is advanced inside the inner tubes 3 and fed through a manifold 6 to the fuel cell (not shown) via a reformed gas outlet 7. The pressure vessel 1 is provided at the other end (the bottom part in the diagram) with a flue gas feed part, which comprises a flue gas feed chamber 8 and a flue gas inlet 9 as illustrated in FIG. 1, for example. The flue gas is made to flow along the outer side (the shell side) of the outer tubes 4 and meanwhile heats the catalyst 5 externally and then is discharged through a flue gas outlet 11. The inner tubes 3 are supported by the manifold 6 and the outer tubes 4 are supported by a tube sheet 12. Since these two groups of tubes are not fixed relative to each other, no stress due to the difference in thermal expansion between the outer tubes and the inner tubes (generally the outer tubes are elevated to a higher temperature) is generated. This very fact constitutes one of the merits found in the adoption of the bayonet type catalyst tubes in the fuel cell reformer which is required to tolerate frequent start-ups and shut-downs and frequent load changes. As a fuel gas for the combustor, generally the exhaust gas from the anode of the fuel cell (which contains unreacted hydrogen because the hydrogen fed to the fuel cell is not wholly utilized) is utilized. This exhaust gas is not easily burnt by itself when it has a small hydrogen content and therefore a low calorific value. Thus, the catalytic combustion is used in the place of the ordinary burner combustion.

As described above, the heat necessary for the reforming reaction is supplied by the flue gas. The flue gas at an elevated temperature (1000° C. to 1500° C.) is made to flow in the shell side of the interior of the pressure vessel and meanwhile heat externally the outer tubes of the bayonet type catalyst tubes. Since the efficiency of heat transfer between the flue gas and the catalyst tubes generally is not very high, various measures have been adopted to date for enhancing the efficiency of heat transfer. For example, the practice of arranging sleeves, orifice baffles, or wire nets near the shell sides in the basal parts of the catalyst tubes (the parts near to the tube sheet and far from the flue gas inlet part) has been made. Though these conventional measures contribute to improving the aforementioned efficiency of heat transfer to a certain extent, the contribution does not deserve to be called fully satisfactory. Further, these measures barely go the length of improving the efficiency of heat transfer in the basal parts of the catalyst tubes after all because they cannot be employed from structural or material reason in the leading parts of the catalyst tubes (the parts far from the tube sheet and near to the flue gas inlet part).

When the capacity of a reformer reaches the scale of multi-megawatts, the number of catalyst tubes falls into the range of from 30 to 60. Thus, the reformer is likely to have uneven operating temperatures among the catalyst tubes. The differences in the operating temperature frequently reach as much as ±100° C. in conventional reformers. The catalyst tubes of higher temperatures suffer from lowered life span and sintering of the reforming catalyst owing to overheating and those of lower temperatures suffer from impaired efficiency of electric power generation owing to a lowered conversion of the raw materials. The following three causes are conceivable for the uneven heating of the catalyst tubes. Firstly, since the heat radiated from the shell wall which has a large heat capacity and a high thermal radiation emissivity elevates excessively the temperatures of the catalyst tubes located particularly in the outer peripheral part of the interior of the pressure vessel (the so-called wall effect) and these catalyst tubes themselves which are so heated to the elevated temperatures radiate heat, the heat balances of the individual catalyst tubes are disturbed by the wall effect or shape factor in thermal radiation between the adjacent catalyst tubes. Secondly, since the flue gas flowing in the shell side frequently generates channelling, those catalyst tubes which are located in the area of a large gas flow rate are heated to higher temperatures. Thirdly, since the feed stock gas flowing in the process side (the catalyst layer) often fails to flow uniformly through the individual catalyst tubes, the amount of heat absorbed by the reforming reaction (endothermic) gets uneven among the individual catalyst tubes, resulting in uneven operating temperatures.

SUMMARY OF THE INVENTION

This invention, in a multi-tubular reformer provided with a plurality of bayonet type double-wall catalyst tubes in a pressure vessel, enhances the transfer of heat between a flue gas and the catalyst tubes and, at the same time, represses the generation of uneven operating temperatures among the plurality of catalyst tubes and consequently solves the aforementioned problems by arranging a porous medium composed of ceramic foams in a shell side flue gas inlet part inside the reformer and causing the porous medium to envelope the leading end parts of the catalyst tubes.

DESCRIPTION OF THE INVENTION

Figure 1:
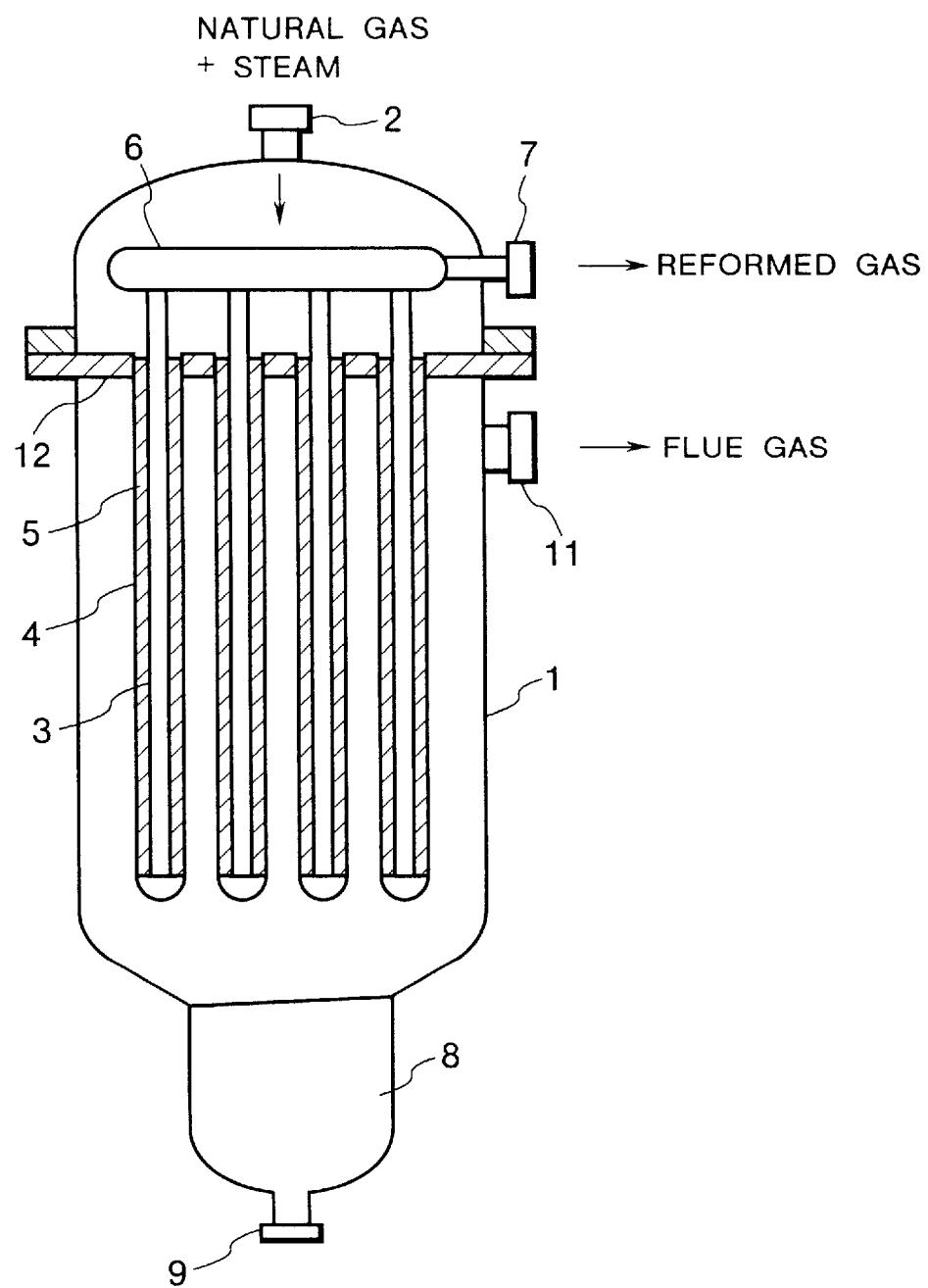
FIG. 1 illustrates one example of the conventional reformer.

The porous media arranged in the shell side flue gas inlet part in the reformer are heated on contact with the hot flue gas flowing in the shell side and made to play the role of accumulating the thermal energy of the hot flue gas and consequently discharging the accumulated thermal energy toward the catalyst tubes. Since the fuel cell reformer which is aimed at a compact structure necessitates a high heat flux, radiant heat transfer is desired to predominate in the high-temperature zone in which the temperature of the flue gas exceeds 1000° C. Generally, since the thermal radiation emissivity of a gaseous substance is extremely small as compared with that of a solid substance, the radiant heat transfer from a gaseous substance necessitates a large gas volume or a large shell side volume and, therefore, cannot be utilized for the fuel cell reformer aimed at a compact structure. The porous media offer a large heat-transfer area (contact area) and quickly accumulate the thermal energy of the flue gas. The porous media which have been heated radiate the accumulated thermal energy toward the walls of the outer tubes of the catalyst tubes and consequently serve to heat the catalyst tubes. Specifically, in the absence of the porous media in the shell side (flue gas side), the transfer of heat from the flue gas to the walls of the outer tubes is made by convective transfer and radiant transfer from the flue gas itself (which is not very effective in a compact structure). In contrast, where the porous media are arranged in the shell side, the transfer of heat from the flue gas to the walls of the outer tubes is attained by the combination of the convective transfer from the flue gas mentioned above with the radiant transfer from the porous media to the walls of the outer tubes. Since the thermal radiation emissivity of the porous media is large as compared with that of the flue gas, the heat transfer efficiency is notably improved for a specified shell side volume.

As one of the reasons for which no means for enhancing heat transfer has been heretofore provided in the shell side near the leading end parts of the catalyst tubes, the fact that the conventional means for enhancing heat transfer is deficient in heat resistance may be cited. To be more specific, the heat transfer enhancing means heretofore provided in the shell side is attached to the outer walls of the outer tubes of the catalyst tubes or connected to the tube sheet supporting the outer tubes and is required from reason of structure to be made of a metallic material. Thus, they have not been usable at such sites as the leading end parts of the catalyst tubes which are exposed to high temperatures exceeding 1000° C. In contrast, the porous media composed of ceramic foams offer much higher heat resistance than that of a metallic material and are usable at such sites of elevated temperatures as the leading end parts of the catalyst tubes.

Generally, since a ceramic material has poor workability as compared with a metallic material, ceramic foams are not easily attached by themselves (without the aid of a metallic material) to the catalyst tubes or the tube sheet. This invention does not entail this particular problem because it arranges the porous medium of ceramic foams in the shell side. The idea of arranging a porous medium in the shell side as mentioned above has never been conceived until the present invention. Packing balls, raschig rings, etc. made of heat-resistive material such as alumina into the shell side has been heretofore adopted to enhance heat transfer efficiency. However, such means has not been able to realize remarkable improvement in the heat transfer efficiency, although it generates a large pressure drop through the shell side due to a large resistance against the flue gas flow.

Further, the fact that the porous media are arranged in the shell side also contributes to ensuring uniform heating of the catalyst tubes. Specifically, since the individual catalyst tubes are enveloped with the porous media, they are no longer exposed directly to the radiant heat from the shell wall or from the other catalyst tubes, and the individual catalyst tubes no longer affect each other in terms of the radiant heat transfer. This fact means that the wall effect and the shape factor otherwise involved in the radiant heat transfer are eliminated. As a result, a unique heat transfer path in which the heat of the flue gas is transferred mainly convectively to the porous media and the heat thus transferred to the porous media is transferred mainly radiantly to the catalyst tubes is established for each of the catalyst tubes and resultantly, the individual catalyst tubes consequently constitute mutually independent and equal entities in terms of the heat transfer. The porous media further confer suitable pressure drop on the flue gas flow path in the shell side extending from the flue gas inlet to the flue gas outlet nozzle part and, as a result, repress the channelling of the flue gas. Particularly by arranging the porous media so as to exert the greater part (not less than 80%) of the pressure drop on the section ranging from the flue gas inlet zone up to the zone seating the group of catalyst tubes, the flow of the flue gas, if complicated with swirl or vortex in the vicinity of the flue gas inlet zone, is rectified and deprived substantially of uneven pressure distribution and velocity distribution in the radial direction en route to the zone seating the group of catalyst tubes. Thus, the degree of unevenness of the flow of the flue gas in the downstream side can be expected to be diminished to a great extent. The first and the second causes mentioned above, therefore, are eliminated. The problem of uneven heating of the individual catalyst tubes substantially ceases to exist when the third cause, i.e. the problem of uneven distribution of the process feed gas flow between the individual catalyst tubes in the process side (which can be solved by uniform loading of the reforming catalyst into each catalyst tube), is eliminated. Incidentally, the porous media are of a heat-accumulating nature as mentioned above, their use brings about an effect of stably maintaining the temperature conditions of the reforming reaction inside the catalyst tubes.

The porous media to be used for the present invention are required to have open cells and a large void ratio to allow easy passage of the flue gas. For the sake of offering a large heat-transfer area for the flow of the flue gas, they are desired to have a large specific surface area. The porous media which fulfill these conditions are represented by ceramic foams containing open cells at a ratio in the approximate range of from 4 to 40, preferably 6 to 13, cells per 25 mm. The ceramic foams of this kind are known to have been adopted for the filtration of molten metal and they can be formed in various shapes. When they are formed in the shape of blocks conforming to the cross-sectional shape of the catalyst tubes and enabled to accommodate the catalyst tubes snugly therein, the efficiency of the arranging work is exalted.

The porous media to be arranged in the upstream side of the flue gas are destined to be heated up to the temperature of the flue gas and, therefore, are required to offer high heat resistance (even to above 1500° C.). Generally, ceramic substances offer high heat resistance as compared with metallic substances. Particularly, the ceramic substances of the mullite type, alumina type, zirconia type, or silicon carbide type have notably high heat resistance and, therefore, are fit for arrangement in the flue gas inlet part in the interior of the pressure vessel. For the ceramic substances to abound in heat resistance, the mere possession of a high melting point does not suffice. It is equally important for the sake of resistance to thermal shock that the thermal expansion coefficient be small and the thermal conductivity be large.

In this invention, since the porous media are intended to envelop the leading end parts of the catalyst tubes and supply the heat necessary for the reforming reaction in the catalyst tubes, they give a temperature gradient such that the temperature gradually decreases in the direction of the downstream of the flue gas in the section ranging from the leading ends of the catalyst tubes to the zone of the flue gas outlet. As a result, the porous media which are arranged in the downstream side and the upstream side of the flue gas may be made of unlike materials because those in the downstream side are not always required to offer very high heat resistance. It is also effective to limit the envelopment with the porous media of ceramic foams to the leading end parts of the catalyst tubes or up to the central parts thereof and pack the space in the downstream side of the flue gas with a stack of wire meshes (such as, for example, demister nets) of metal having as high a thermal radiation emissivity and as large as surface area as ceramic foams.

DESCRIPTION OF THE PREFERRED EMBODIMENTS

Figure 2:
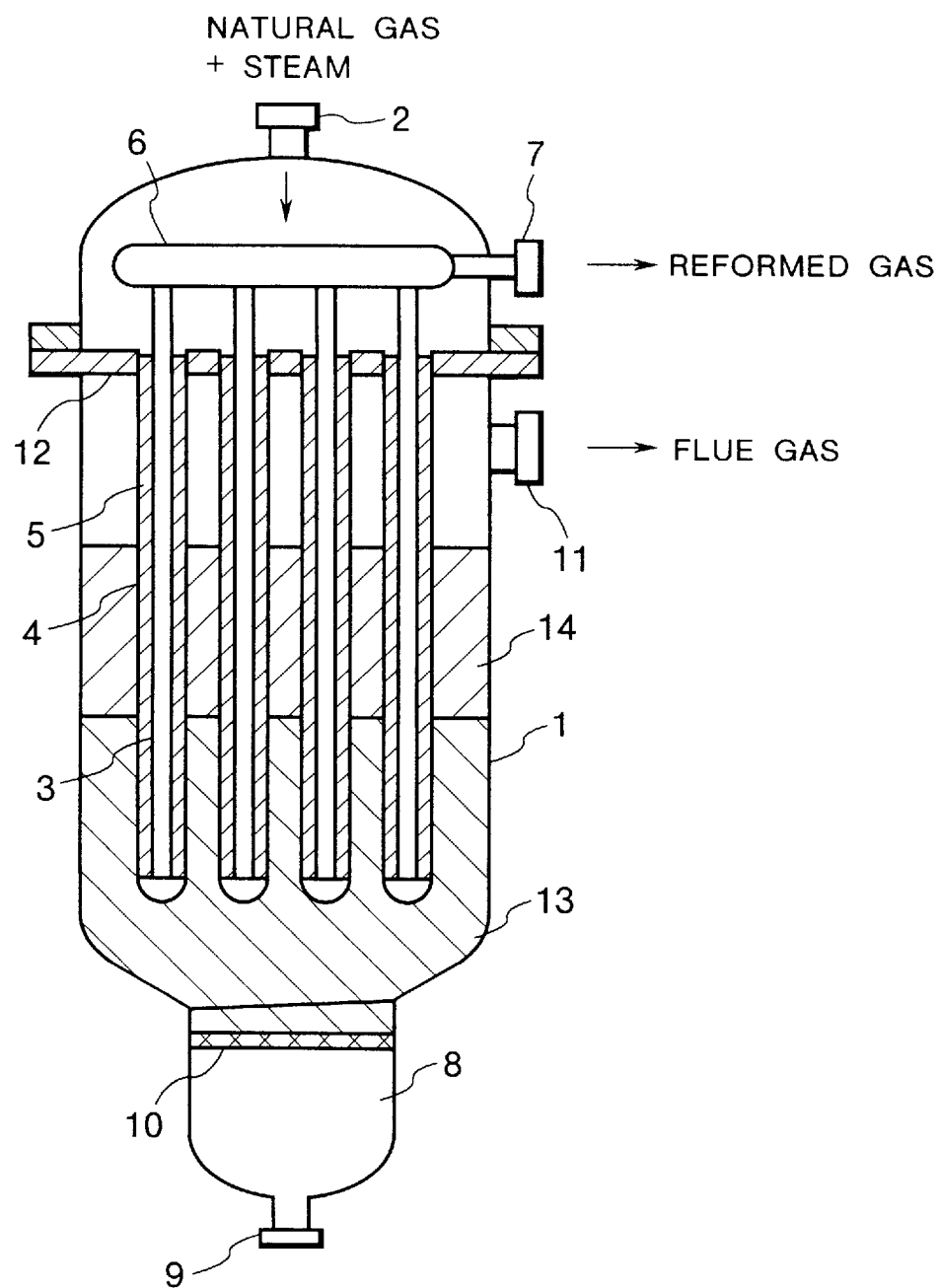
FIG. 2 illustrates one example of the reformer according to this invention.

FIG. 2 illustrates a preferred embodiment of this invention. This embodiment has an apparatus of FIG. 1 arranged with porous media 13 and 14 made of a ceramic foam containing open cells to such an extent as to envelop catalyst tubes up to about two thirds of the length of catalyst tube from the leading end side. The porous media 13 are formed of a material having higher heat resistance than the material of the porous media 14. These porous media composed of ceramic foams are so formed as to accommodate the catalyst tubes snugly therein. The arrangement of the porous media in the pressure vessel, when the pressure vessel is installed with the flue gas inlet part directed downward as illustrated in FIG. 2, for example, may be attained by first setting in the bottom part of the interior of the pressure vessel a lump of porous media shaped in conformity with the shape of the bottom part of the pressure vessel, then arranging porous media so as to form holes for accommodating the catalyst tubes therein, and thereafter inserting the outer tubes of the catalyst tubes into the holes. Otherwise, it may be accomplished by first setting the outer tubes in position and then arranging porous media so as to fill the space remaining inside the pressure vessel after the setting of the outer tubes.

Figure 3:
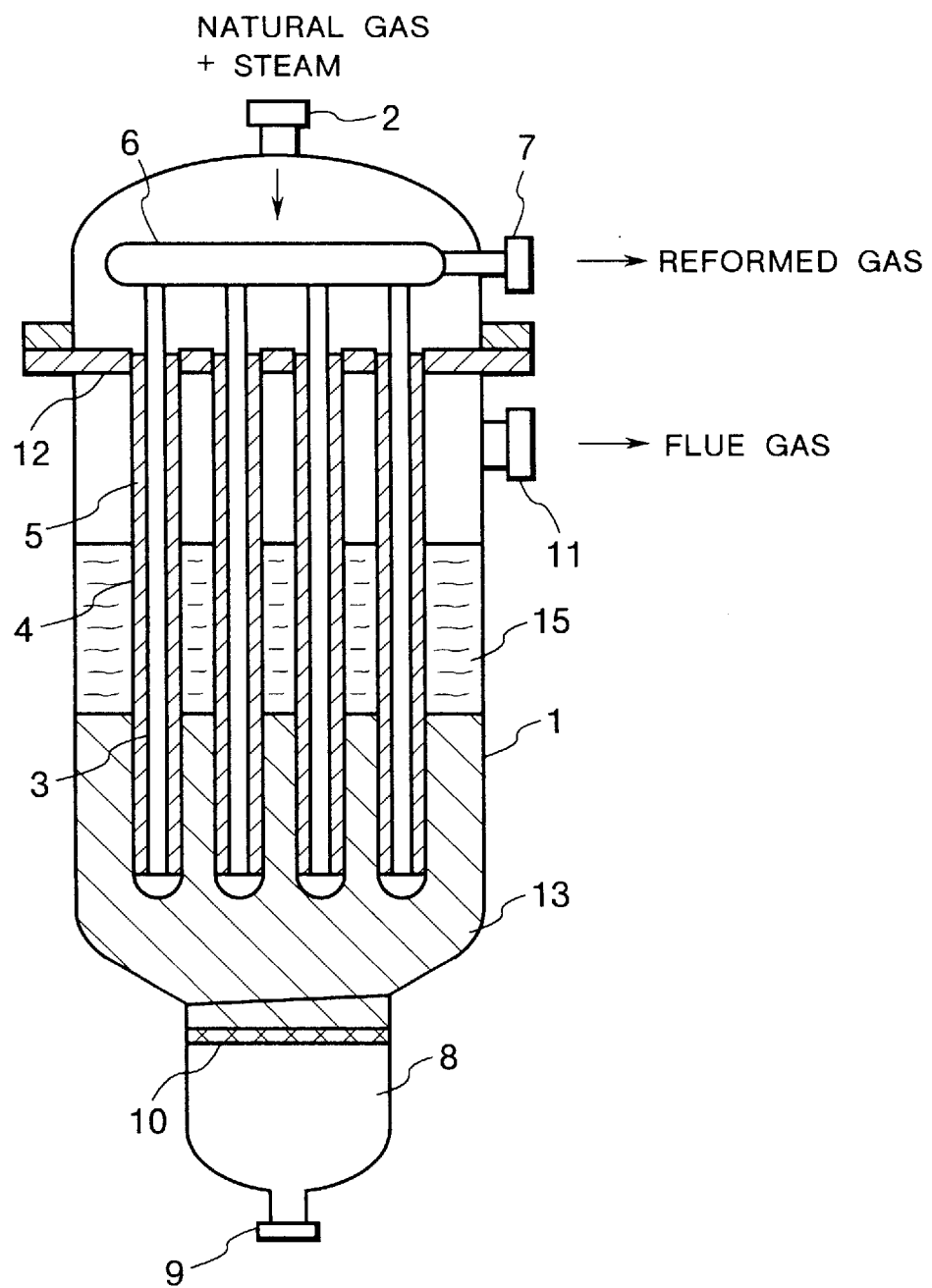
FIG. 3 illustrates another example of the reformer according to this invention.

FIG. 3 illustrates another preferred embodiment of this invention. This embodiment has an apparatus of FIG. 1 arranged with porous media 13 of ceramic foams containing open cells to such an extent as to envelope catalyst tubes up to about one third of the length of catalyst tube from the leading end side and, on the adjoining downstream side of the flue gas, with demister nets 15 to such an extent as to envelope catalyst tubes in a length of about one third of the central part of catalyst tube.

Figure 4:
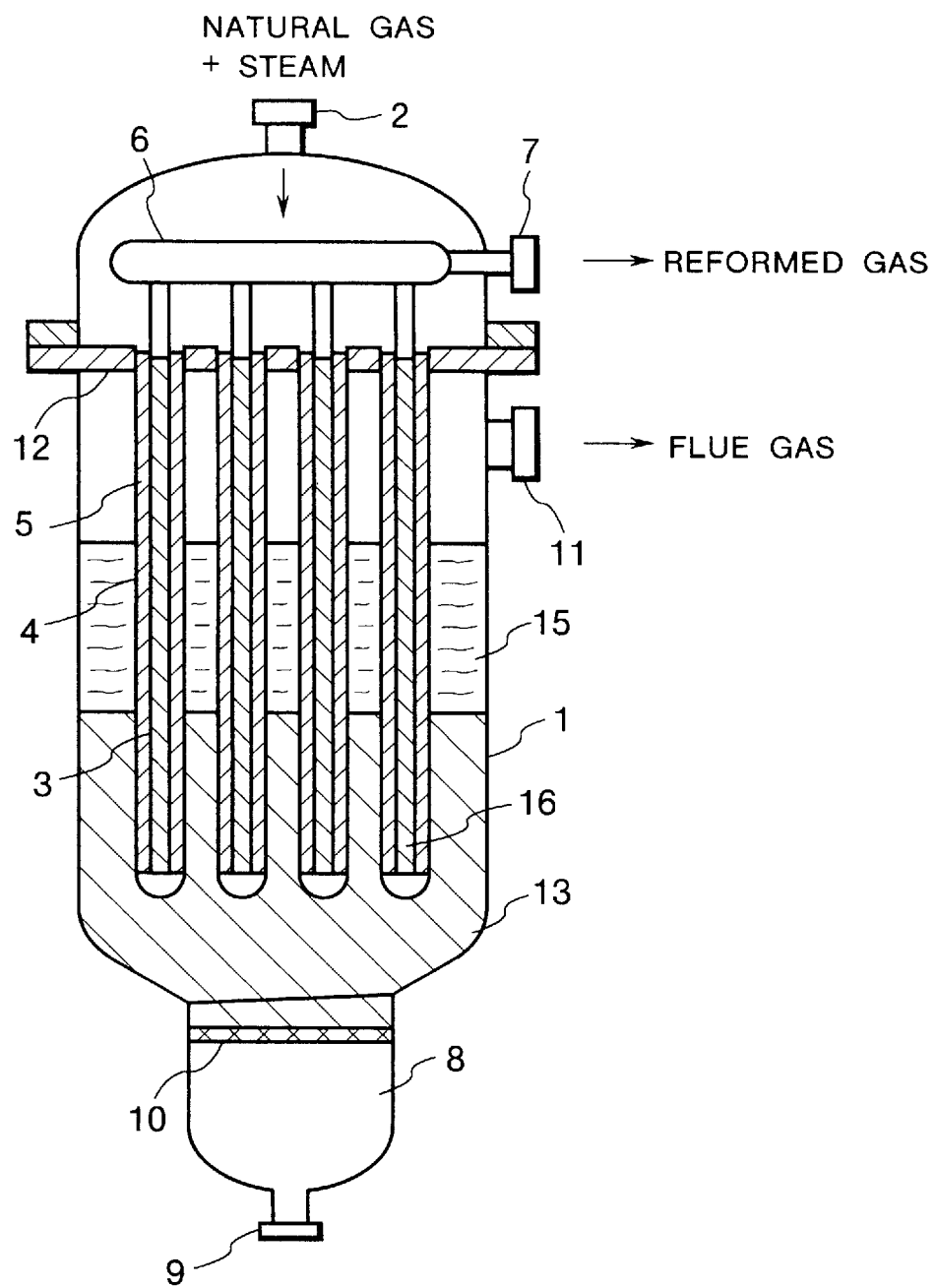
FIG. 4 illustrates yet another example of the reformer according to this invention.

FIG. 4 illustrates yet another preferred embodiment of this invention. This embodiment has the inner tubes of the catalyst tubes in an apparatus of FIG. 3 arranged with porous media 16 of ceramic foams containing open cells. In this structure, the transfer of heat between the hot reformed gas passing inside the inner tubes and the cold feed stock gas passing inside the catalyst layer is enhanced and the effective utilization of heat is ensured.

The practice of packing the inner tubes with demister nets or arranging sleeves in the inner tubes has been proposed for the purpose of enhancing the transfer of heat between the reformed gas passing inside the inner tubes and the feed stock gas passing inside the catalyst layer. Since the demister nets or the sleeves are made of a metallic material containing nickel or chromium, they tend to manifest a catalytic activity to, induce the Boudouard's reaction as shown by the following formula, and entail the formation of carbon. Thus, the practice under discussion has the disadvantage that, even when natural gas having methane as its main component is used as a feed stock gas, the molar ratio of steam to carbon (S/C ratio) cannot be decreased below 3.0 to preclude the detrimental reaction:

$$2CO \rightarrow C + CO_2$$

In contrast to such conventional means as demister nets or sleeves, the porous media of a ceramic material have a very scanty activity to catalyze the Boudouard's reaction and allow the S/C ratio to be lowered to a level of about 2.5 and, therefore, lower the stream consumption and facilitate to exalt the efficiency of electric power generation.

Reforming Test 1:

An apparatus as illustrated in FIG. 4 was used for reforming natural gas. The apparatus incorporated five bayonet type catalyst tubes each consisting of an inner tube 165.2 mm in outside diameter and an outer tube 216.3 mm in outside diameter. A reforming catalyst (produced by Toyo CCI K.K. and marketed under brand of "FCR-4" was loaded in a height of 2700 mm. Porous media of a mullite type ceramic foam of a nominal size #13 (11 cells/25 mm) were used. Demister nets 15 made of stainless steel (SUS 310S) and having a void ratio of 99% and a density of 80 kg/m$^3$ were used. Porous media 16 of a mullite type ceramic foam of a nominal size #6 (4 to 9 cells/25 mm) were used in a height of 2700 mm inside the inner tubes. The natural gas had the following composition.

| | |
|---|---|
| $CH_4$ | 89.6% |
| $C_2H_6$ | 5.2% |
| $C_3H_8$ | 3.4% |
| $C_4H_{10}$ | 1.8% |

This natural gas was fed at a rate of 170 Nm$^3$/H and steam was simultaneously fed at a rate of 491 kg/H (S/C=3.0). The temperature at the inlet to the reformer was 434° C., the temperature in the bottom parts of the catalyst tubes was 800° C., the pressure in the bottom parts of the catalyst tubes was 2.4 kg/cm$^2$G, and the temperature at the outlet of the reformer was 600° C. The composition of the reformed gas was as follows.

| | |
|---|---|
| $H_2$ | 54.8% |
| CO | 9.4% |
| $CO_2$ | 7.3% |
| $CH_4$ | 0.6% |
| $H_2O$ | 27.9% |

The average heat flux (based on the outer surface area of the catalyst tubes) found at this time was 61000 Kcal/m$^2$ H.

Reforming Test 2:

An apparatus as illustrated in FIG. 4 and having a larger size was used for reforming natural gas. The apparatus incorporated 30 bayonet type catalyst tubes each consisting of an inner tube 165.2 mm in outside diameter and an outer tube 216.3 mm in outside diameter. A reforming catalyst (produced by Toyo CCI K.K. and marketed under brand of "FCR-4") was loaded in a height of 3000 mm. Porous media of a mullite type ceramic foam of a nominal size #13 (11 cells/25 mm) were used. Demister nets 15 made of stainless steel (SUS 310S) and having a void ratio of 99% and a density of 80 kg/m$^3$ were used. Porous media 16 of a mullite type ceramic foam of a nominal size #6 (4 to 9 cells/25 mm) were used in a height of 3000 mm inside the inner tubes. The natural gas had the following composition.

| | |
|---|---|
| $CH_4$ | 89.6% |
| $C_2H_6$ | 5.2% |
| $C_3H_8$ | 3.4% |
| $C_4H_{10}$ | 1.8% |

This natural gas was fed at a rate of 998 Nm$^3$/H and steam was simultaneously fed at a rate of 2407 kg/H (S/C=2.5). The temperature at the inlet to the reformer was 450° C., the temperature in the bottom parts of the catalyst tubes was 775° C. on the average, the pressure in the bottom parts of the catalyst tubes was 0.3 kg/cm$^2$G, and the temperature at the outlet of the reformer was 550° C. The composition of the reformed gas was as follows.

| | |
|---|---|
| $H_2$ | 59.9% |
| CO | 10.3% |
| $CO_2$ | 8.0% |
| $CH_4$ | 0.7% |
| $H_2O$ | 21.1% |

The average heat flux (based on the outer surface area of the catalyst tubes) found at this time was 55000 Kcal/m$^2$ H.

The temperatures at the outlet parts of the catalyst layers of the 30 catalyst tubes were in the range of 775±30° C., indicating that the unevenness of temperature was ±30° C. The pressure drop through from the flue gas inlet part to the outlet part was 400 mm $H_2O$, of which the pressure drop through the ceramic foam part and the demister net part was about 350 mm $H_2O$.

In accordance with this invention, the transfer of heat from the flue gas to the catalyst tubes is enhanced because the porous media accumulate the heat from the flue gas and radiate the accumulated heat in the direction of the walls of the outer tubes. The otherwise possible uneven heating of the catalyst tubes can be precluded because the wall effect and the channelling of the flue gas are repressed. As a result, the thermal energy of the flue gas can be effectively utilized for the reforming reaction and the operation of the reformer can be stabilized.

What is claimed is:

1. A method of production of a reformed gas composed mainly of hydrogen and carbon monoxide to be used for a fuel cell comprising providing a multi-tubular reformer including a plurality of bayonet double-wall catalyst tubes in a pressure vessel having a flue gas inlet, feeding a hydrocarbon gas and steam to said catalyst tubes of said reformer, and feeding a heated flue gas through said flue gas inlet, wherein porous media composed of ceramic foams containing open cells at a ratio in the range of 4 to 40 cells per 25 mm are arranged within the pressure vessel adjacent to the flue gas inlet so as to envelop leading end parts of said catalyst tubes and create essentially no gap between outer surfaces of said catalyst tubes and inner surfaces of said porous media enveloping said leading end parts in an operating condition, whereby at least a predominant portion said flue gas flows through said porous media to heat said porous media.

2. A method according to claim 1, wherein said porous media envelop not less than about one third of the length of said catalyst tubes on the leading end parts thereof and fill a part or the whole of a zone interconnecting said catalyst tubes and the flue gas inlet.

3. A method according to claim 1, wherein a stack of wire meshes is packed continuously in the flue gas downstream side of said porous media.

4. A method according to claim 1, wherein said porous media are composed of ceramic foams containing open cells.

5. A method according to claim 4, wherein said porous media are formed in conformity with the shape of said catalyst tubes.

6. A method according to claim 1, wherein said ceramic foams are of a material selected from the group consisting of mullite, alumina, zirconia and silicon carbide.

7. A multi-tubular reformer including a plurality of bayonet double-wall catalyst tubes in a pressure vessel having a flue gas inlet, and porous media composed of ceramic foams containing open cells at a ratio in the range of 4 to 40 cells per 25 mm arranged within the pressure vessel adjacent to the flue gas inlet so as to envelop leading end parts of said catalyst tubes and create essentially no gap between outer surfaces of said catalyst tubes and inner surfaces of said porous media enveloping said leading end parts in an operating condition, whereby at least a prominent portion of heated flue gas fed through said flue gas inlet flows through said porous media to heat said porous media.

8. A reformer according to claim 7, wherein said porous media envelop not less than about one third of the length of said catalyst tubes on the leading end parts thereof and fill a part or the whole of a zone interconnecting said catalyst tubes and the flue gas inlet.

9. A reformer according to claim 7, wherein a stack of wire meshes is packed continuously in the flue gas downstream side of said porous media.

10. A reformer according to claim 7, wherein said porous media are composed of ceramic foams containing open cells.

11. A reformer according to claim 10, wherein said porous media are formed in conformity with the shape of said catalyst tubes.

12. A reformer according to claim 10, wherein said ceramic foams are of a material selected from the group consisting of mullite, alumina, zirconia and silicon carbide.

* * * * *